(12) United States Patent
Zhao et al.

(10) Patent No.: US 12,379,271 B1
(45) Date of Patent: Aug. 5, 2025

(54) MOUNTING DEVICE AND METHOD OF TANDEM-TYPE ROCK MASS THREE-DIMENSIONAL DISTURBANCE STRESS SENSOR

(71) Applicant: Institute of Rock and Soil Mechanics, Chinese Academy of Sciences, Wuhan (CN)

(72) Inventors: Wusheng Zhao, Wuhan (CN); Weizhong Chen, Wuhan (CN); Changkun Qin, Wuhan (CN); Xianjun Tan, Wuhan (CN); Hou Gao, Wuhan (CN); Peiyao Xie, Wuhan (CN); Yiyue Tong, Wuhan (CN); Shuai Zhou, Wuhan (CN); Zhichao Xu, Wuhan (CN)

(73) Assignee: Institute of Rock and Soil Mechanics, Chinese Academy of Sciences, Wuhan (CN)

( * ) Notice: Subject to any disclaimer, the term of this patent is extended or adjusted under 35 U.S.C. 154(b) by 0 days.

(21) Appl. No.: 19/082,459

(22) Filed: Mar. 18, 2025

(30) Foreign Application Priority Data

Jul. 16, 2024 (CN) .......................... 202410951342.5

(51) Int. Cl.
*G01L 5/00* (2006.01)
*G01V 1/01* (2024.01)
*E21C 39/00* (2006.01)

(52) U.S. Cl.
CPC ............ *G01L 5/0004* (2013.01); *E21C 39/00* (2013.01); *G01V 1/01* (2024.01)

(58) Field of Classification Search
CPC .......... G01L 5/0004; G01V 1/01; E21C 39/00
See application file for complete search history.

(56) References Cited

U.S. PATENT DOCUMENTS

| | | | |
|---|---|---|---|
| 10,082,433 B2 * | 9/2018 | Wang | E21C 39/00 |
| 10,914,164 B2 * | 2/2021 | Zou | E21B 47/06 |
| 11,878,146 B2 * | 1/2024 | Kraft | A61M 5/24 |

FOREIGN PATENT DOCUMENTS

| | | | |
|---|---|---|---|
| CN | 104132761 A | | 11/2014 |
| CN | 204536163 U | * | 8/2015 |
| CN | 106989849 A | | 7/2017 |

(Continued)

*Primary Examiner* — Octavia Hollington
(74) *Attorney, Agent, or Firm* — Nitin Kaushik

(57) ABSTRACT

The present invention provides a mounting device and method of a tandem-type rock mass three-dimensional disturbance stress sensor, and the device is formed by sequentially connecting a head end unit, a plurality of repetitive units, and a tail end unit. This invention enables the accurate installation of multiple three-dimensional disturbance stress sensors within a single borehole without requiring full-hole grouting. As a result, the sensors can be mounted in a multi-point distributed arrangement within the same borehole. Adhesive fluid in a top adhesive cartridge is triggered through a head end triggering mechanism to bond a three-dimensional disturbance stress sensor in a first repetitive unit, and adhesive fluid in a corresponding first adhesive cartridge is triggered by using the first triggering mechanism to bond a three-dimensional disturbance stress sensor in a next repetitive unit, to ensure good coupling between the three-dimensional disturbance stress sensor and a rock mass.

10 Claims, 8 Drawing Sheets

(56) References Cited

FOREIGN PATENT DOCUMENTS

| | | | |
|---|---|---|---|
| CN | 117803383 A | | 4/2024 |
| CN | 118933731 A | * | 11/2024 |
| CN | 119308706 A | * | 1/2025 |

* cited by examiner

MOUNTING DEVICE AND METHOD OF TANDEM-TYPE ROCK MASS THREE-DIMENSIONAL DISTURBANCE STRESS SENSOR

CROSS-REFERENCE TO RELATED APPLICATIONS

The application claims priority to Chinese patent application No. 2024109513425, filed on Jul. 16, 2024, the entire contents of which are incorporated herein by reference.

TECHNICAL FIELD

The present invention belongs to the technical field of geotechnical engineering geostress testing, and particularly relates to a mounting device and method of a tandem-type rock mass three-dimensional disturbance stress sensor.

BACKGROUND

Stress is the fundamental force that causes the deformation and destruction of the deep rock mass. Understanding the state of stress is important for a variety of rock mechanics applications, such as geotechnical engineering design, surrounding rock failure and stability analyses, earthquake potential evaluation, and hydraulic fracturing analysis.

The stress state of the rock mass is mainly composed of two parts. One is the in-situ stress, also referred to as initial stress, which exists in the rock mass before any human engineering activities occur. The other is the additional stress, referred to as disturbance stress, which is generated on the basis of the initial stress after mining and excavation activities occur. In terms of primary rock stress measurement, numerous mature testing methods and equipment have been developed, widely applied, and validated. Monitoring and analyzing the change rules of the disturbance stress during mining and excavation of the surrounding rocks is an important approach to understanding the engineering rock mass instability process. However, at present, due to the lack of reliable technical equipment for monitoring the disturbance stress, it is very difficult to measure the disturbance stress of the rock mass in real time. At present, the existing equipment for monitoring the disturbance stress has two major limitations. First, it is difficult to perform multi-point measurements. Only one sensor can be arranged in a borehole most of the time. For example, when a CSIRO hollow inclusion sensor is used for testing, it is difficult to implement a single-hole multi-point tandem-type measurement. Second, it is difficult to perform mounting. Even if sensors are pushed into the hole in series, the sensors are fixed in the hole by using a full-hole grouting method only. This method is cumbersome in mounting, cannot ensure the compactness of the grout in the hole, and is difficult to ensure good coupling between the sensors and the rock mass particularly, resulting in significant errors in stress monitoring results.

Therefore, how to provide a mounting method of a tandem-type rock mass three-dimensional disturbance stress sensor to arrange a plurality of three-dimensional disturbance stress sensors in one borehole accurately and ensure good coupling between the three-dimensional disturbance stress sensors and the rock mass, to accurately monitor the disturbance stress of the rock mass is a technical problem to be solved urgently by a person skilled in the art.

SUMMARY

A purpose of the present invention is to provide a mounting device and method of a tandem-type rock mass three-dimensional disturbance stress sensor, to at least solve one of the above technical problems.

To achieve the above purpose, according to a first aspect of the present invention, a mounting device of a tandem-type rock mass three-dimensional disturbance stress sensor is provided. The mounting device is formed by sequentially connecting a head end unit, a plurality of repetitive units, and a tail end unit. The head end unit includes: a top adhesive cartridge, where a head end triggering mechanism is disposed in the top adhesive cartridge, and the head end triggering mechanism is configured to control adhesive fluid in the top adhesive cartridge to flow out; and a head end assembling member, where one end is fixedly connected to a bottom end of the top adhesive cartridge, and the other end of the head end assembling member is fixedly connected to the repetitive unit. Each repetitive unit includes: a three-dimensional disturbance stress sensor; a first assembling member, where one end is fixedly connected to the other end of the three-dimensional disturbance stress sensor; a first hole packer, disposed in a middle of the first assembling member and configured to block the adhesive fluid; a first pushing rod, where one end is fixedly connected to the other end of the first assembling member; a second assembling member, where one end is fixedly connected to the other end of the first pushing rod; a first adhesive cartridge, where a first triggering mechanism is disposed in the first adhesive cartridge, the first triggering mechanism is configured to control adhesive fluid in the first adhesive cartridge to flow out, and a top end of the first adhesive cartridge is fixedly connected to the other end of the second assembling member; and a third assembling member, where one end is fixedly connected to a bottom end of the first adhesive cartridge. One end of a three-dimensional disturbance stress sensor of a first repetitive unit in the plurality of repetitive units is fixedly connected to the other end of the head end assembling member, the other end of a third assembling member of the first repetitive unit is fixedly connected to one end of a three-dimensional disturbance stress sensor of a next repetitive unit, and the other end of a three-dimensional disturbance stress sensor of a last repetitive unit is fixedly connected to the tail end unit. The tail end unit includes: a tail end assembling member, where one end is fixedly connected to the other end of the three-dimensional disturbance stress sensor of the last repetitive unit; and a tail end pushing rod, where one end is detachably connected to the other end of the tail end assembling member.

In the first aspect, the head end triggering mechanism includes: a micro motor, where the micro motor is fixed in the top adhesive cartridge; a spring, where one end of the spring is fixed on the micro motor; a vertical rod, where a top end of the vertical rod is fixedly connected to the other end of the spring; and a blocking member, where the blocking member is fixed at a bottom end of the vertical rod and is configured to prevent the adhesive fluid in the top adhesive cartridge from flowing out.

In the first aspect, the first hole packer includes: a rubber airbag, where the rubber airbag is sleeved on a middle side wall of the first assembling member; a first stainless steel cable tie, configured to fix one end of the rubber airbag to the first assembling member; and a second stainless steel cable tie, configured to fix the other end of the rubber airbag to the first assembling member.

In the first aspect, the head end unit further includes a stainless steel conical hole cover, and the stainless steel conical hole cover is detachably connected to a top end of the top adhesive cartridge.

In the first aspect, the top adhesive cartridge and the first adhesive cartridge are both configured to store the adhesive fluid; an upper portion of the top adhesive cartridge is provided with two head end adhesive inlets in an evenly-spaced manner, and a lower portion of the top adhesive cartridge is provided with four head end adhesive outlets in an evenly-spaced manner; and an upper portion of the first adhesive cartridge is provided with two first adhesive inlets in an evenly-spaced manner, and a lower portion of the first adhesive cartridge is provided with four first adhesive outlets in an evenly-spaced manner.

In the first aspect, the mounting device further includes a triggering power supply, and the triggering power supply is sequentially connected to the first triggering mechanism in each repetitive unit and the head end triggering mechanism through a cable; and the triggering power supply includes an indicator light and a switch, where the indicator light is configured to indicate whether each first triggering mechanism and the head end triggering mechanism are successfully triggered, and the switch is configured to control each first triggering mechanism and the head end triggering mechanism to be powered on.

In the first aspect, the tail end assembling member includes: a connecting member, where one end of the connecting member is fixedly connected to the other end of the three-dimensional disturbance stress sensor of the last repetitive unit, and the other end of the connecting member is detachably connected to one end of the tail end pushing rod; and a tail end hole packer, where the tail end hole packer is sleeved on a middle side wall of the connecting member, one end of the tail end hole packer is fixedly connected to the connecting member through a first cable tie, and the other end of the tail end hole packer is fixedly connected to the connecting member through a second cable tie.

In the first aspect, the mounting device further includes an external pressurizer, and the external pressurizer is sequentially connected to the tail end hole packer and the first hole packer in each repetitive unit through an air pipe; and the external pressurizer is provided with a pressure gauge, and the pressure gauge is configured to indicate pressure in the tail end hole packer and each first hole packer.

According to a second aspect of the present invention, a mounting method of a tandem-type rock mass three-dimensional disturbance stress sensor is provided. Disturbance stress of a rock mass is monitored by using the mounting device of a tandem-type rock mass three-dimensional disturbance stress sensor according to the first aspect, and the method includes: providing a borehole that is at a preset dip angle in a tunnel or a lane, detecting the borehole by using a borehole camera, and recording detected data of the borehole; determining a quantity and mounting positions of three-dimensional disturbance stress sensors according to the detected data, calculating a distance between three-dimensional disturbance stress sensors in two adjacent repetitive units, and determining a quantity of first pushing rods as N−1; filling adhesive fluid in a top adhesive cartridge, and disposing a head end triggering mechanism in the top adhesive cartridge, to control the adhesive fluid in the top adhesive cartridge to flow out; connecting the top adhesive cartridge to a three-dimensional disturbance stress sensor of a first repetitive unit through a head end assembling member, connecting the three-dimensional disturbance stress sensor of the first repetitive unit to a first first pushing rod through a first assembling member, and disposing a first hole packer in a middle of the first assembling member, to block the adhesive fluid flowing out of the top adhesive cartridge; delivering the three-dimensional disturbance stress sensor of the first repetitive unit to a preset mounting position in the borehole through the first first pushing rod; filling adhesive fluid in a first adhesive cartridge, and disposing a first triggering mechanism in the first adhesive cartridge, to control the adhesive fluid in the first adhesive cartridge to flow out; connecting the first adhesive cartridge to the first first pushing rod through a second assembling member, and fixedly connecting one end of a third assembling member to a bottom end of the first adhesive cartridge; fixedly connecting the other end of the third assembling member of the first repetitive unit to one end of a three-dimensional disturbance stress sensor of a second repetitive unit, fixedly connecting the other end of the three-dimensional disturbance stress sensor of the second repetitive unit to a second first pushing rod through a first assembling member of the second repetitive unit, and disposing a first hole packer in a middle of the first assembling member of the second repetitive unit, to block the adhesive fluid flowing out of the first adhesive cartridge in the first repetitive unit; delivering the three-dimensional disturbance stress sensor of the second repetitive unit to a preset mounting position in the borehole through the second first pushing rod; by analogy, fixedly connecting the other end of a third assembling member of a $(N-2)^{th}$ repetitive unit to one end of a three-dimensional disturbance stress sensor of a $(N-1)^{th}$ repetitive unit, fixedly connecting the other end of the three-dimensional disturbance stress sensor of the $(N-1)^{th}$ repetitive unit to a $(N-1)^{th}$ first pushing rod through a first assembling member of the $(N-1)^{th}$ repetitive unit, and blocking adhesive fluid flowing out of a first adhesive cartridge in the $(N-2)^{th}$ repetitive unit through a first hole packer of the $(N-1)^{th}$ repetitive unit; delivering the three-dimensional disturbance stress sensor of the $(N-1)^{th}$ repetitive unit to a preset mounting position in the borehole through the $(N-1)^{th}$ first pushing rod; fixedly connecting the other end of a third assembling member of the $(N-1)^{th}$ repetitive unit to one end of a three-dimensional disturbance stress sensor of an $N^{th}$ repetitive unit, fixedly connecting the other end of the three-dimensional disturbance stress sensor of the $N^{th}$ repetitive unit to one end of a tail end assembling member, and detachably connecting the other end of the tail end assembling member to a tail end pushing rod; and delivering the three-dimensional disturbance stress sensor of the $N^{th}$ repetitive unit to a preset mounting position in the borehole through the tail end pushing rod, to mount the tandem-type rock mass three-dimensional disturbance stress sensor, where N−1 is an integer greater than 1.

In the second aspect, the method further includes: disposing a triggering power supply and an external pressurizer on an external portion of the borehole, where the triggering power supply is sequentially connected to the first triggering mechanism in each repetitive unit and the head end triggering mechanism through a cable and is configured to trigger the adhesive fluid in the top adhesive cartridge and each first adhesive cartridge to flow out; and the external pressurizer is sequentially connected to the first hole packer in each repetitive unit through an air pipe and is configured to adjust pressure in each first hole packer, to seal the borehole.

Beneficial Effects:

The mounting device of the tandem-type rock mass three-dimensional disturbance stress sensor provided in the present invention is formed by sequentially connecting the head end unit, the plurality of repetitive units, and the tail end unit. The head end unit includes the top adhesive cartridge and the head end assembling member, and the head end triggering mechanism is disposed in the top adhesive cartridge, to control the adhesive fluid in the top adhesive cartridge to flow out. One end of the head end assembling member is fixedly connected to the bottom end of the top adhesive cartridge, and the other end thereof is fixedly connected to the repetitive unit, to form the top adhesive cartridge and the repetitive unit into a whole. Each repetitive unit includes the three-dimensional disturbance stress sensor, the first assembling member, and the first hole packer. One end of the three-dimensional disturbance stress sensor of the first repetitive unit in the plurality of repetitive units is fixedly connected to the other end of the head end assembling member, and the other end thereof is fixedly connected to the first assembling member, to fix a measuring direction of the three-dimensional disturbance stress sensor. The first hole packer is disposed in the middle of the first assembling member, and when the adhesive fluid in the top adhesive cartridge flows out to the vicinity of the three-dimensional disturbance stress sensor, the first hole packer not only can seal the borehole, but also can prevent the adhesive fluid from continuing to flow, thereby reducing the use amount of the adhesive fluid and improving a coupling effect between the three-dimensional disturbance stress sensor and the rock mass. Each repetitive unit further includes the first pushing rod, the second assembling member, the first adhesive cartridge, and the third assembling member. One end of the first pushing rod is fixedly connected to the first assembling member, to facilitate delivering the three-dimensional disturbance stress sensor to the pre-mounting position. One end of the second assembling member is fixedly connected to the other end of the first pushing rod, and the other end thereof is fixedly connected to the top end of the first adhesive cartridge. One end of the third assembling member of the first repetitive unit is fixedly connected to the bottom end of the first adhesive cartridge, the other end thereof is fixedly connected to one end of the three-dimensional disturbance stress sensor in the next repetitive unit, and the first triggering mechanism is disposed in the first adhesive cartridge, to facilitate performing adhesive injection on the three-dimensional disturbance stress sensor in the next repetitive unit by using the adhesive fluid in the first adhesive cartridge. In this way, a plurality of three-dimensional disturbance stress sensors are mounted in one borehole at intervals. The tail end unit includes the tail end assembling member and the tail end pushing rod. One end of the tail end assembling member is fixedly connected to the other end of the three-dimensional disturbance stress sensor of the last repetitive unit, and the other end thereof is detachably connected to the tail end pushing rod, to facilitate delivering the last three-dimensional disturbance stress sensor to the pre-mounting position in the borehole by the tail end pushing rod or to perform recycling. In the present invention, the plurality of three-dimensional disturbance stress sensors can be accurately mounted in one borehole without adopting full-hole grouting bonding, thereby mounting the rock mass three-dimensional disturbance stress sensors in a single-hole multi-point distributive manner. The adhesive fluid in the top adhesive cartridge is triggered through the head end triggering mechanism to bond the three-dimensional disturbance stress sensor in the first repetitive unit, and the adhesive fluid in the corresponding first adhesive cartridge is triggered by using the first triggering mechanism to bond the three-dimensional disturbance stress sensor in another repetitive unit, to ensure good coupling between the three-dimensional disturbance stress sensor and the rock mass, thereby improving mounting convenience and correctness of the three-dimensional disturbance stress sensor, ensuring that rock mass disturbance stress is successfully monitored, and avoiding resulting in failure of a stress monitoring sensor, a large error in results, repeated testing costs, and apparatus loss.

BRIEF DESCRIPTION OF THE DRAWINGS

To illustrate the technical solutions in the embodiments of the present invention or in the prior art more clearly, the following briefly introduces the accompanying drawings to be used for describing the embodiments. Obviously, the accompanying drawings in the following description only show some embodiments of the present invention, and those of ordinary skill in the art may still derive other accompanying drawings from these accompanying drawings without creative efforts.

Figure 1:
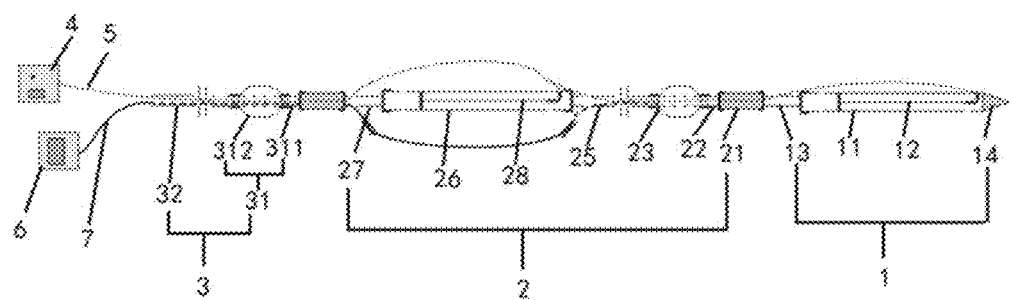
FIG. 1 is a schematic structural diagram of a mounting device of a tandem-type rock mass three-dimensional disturbance stress sensor according to the present invention.

REFERENCE NUMERALS 1. head end unit; 11. top adhesive cartridge; 111. head end adhesive inlet; 112. head end adhesive outlet; 12. head end triggering mechanism; 121. micro motor; 122. spring; 123. vertical rod; 124. blocking member; 13. head end assembling member; 131. first bolt interface; 132. second bolt interface; 133. first cable penetrating opening; 134. first cable outlet; 14. stainless steel conical hole cover;
2. repetitive unit; 21. three-dimensional disturbance stress sensor; 22. first assembling member; 221. third threaded interface; 23. first hole packer; 231. rubber airbag; 232. first stainless steel cable tie; 233. second stainless steel cable tie; 24. first pushing rod; 241. square interface; 242. latch opening; 243. opening slot; 25. second assembling member; 251. fourth bolt interface; 252. second cable penetrating opening; 253. fifth bolt interface; 254. second cable outlet; 255. third cable outlet; 26. first adhesive cartridge; 27. third assembling member; 28. first triggering mechanism;
3. tail end unit; 31. tail end assembling member; 311. connecting member; 312. tail end hole packer; 32. tail end pushing rod;
4. triggering power supply;
5. cable;
6. external pressurizer;
7. air pipe.

DETAILED DESCRIPTION OF THE EMBODIMENTS

An explicit and complete description of the technical solutions in the present invention is given below in conjunction with the accompanying drawings. Apparently, the described embodiments are only some rather than all of the embodiments of the present invention. All other embodiments obtained by those of ordinary skill in the art based on the embodiments of the present invention shall fall within the protection scope of the present invention.

Meanwhile, in the embodiments of the specification, when an assembly is referred to as being "fixed to" another assembly, it may be directly positioned on the other assembly or there may be a centered assembly. When an assembly is referred to as being "connected" to another assembly, it may be directly connected to the other assembly or there may be a centered assembly at the same time. When an assembly is referred to as being "disposed" on another assembly, it may be directly disposed on the other assembly or there may be a centered assembly at the same time.

In addition, descriptions involving "first", "second", and the like in the present invention are merely intended for descriptive purposes and should not be construed as indicating or implying their relative importance or implying the quantity of technical features indicated. Therefore, defining a feature with "first" and "second" can explicitly or implicitly indicate that at least one of such features is included. In addition, the technical solutions in the embodiments can be combined with each other, but only on the basis that they can be realized by those of ordinary skill in the art. When the combination of the technical solutions is contradictory or cannot be implemented, it should be considered that the combination of the technical solutions does not exist and does not fall within the protection scope of the present invention.

Embodiment 1

Referring to FIG. 1, the present invention provides a mounting device of a tandem-type rock mass three-dimensional disturbance stress sensor 21. The mounting device is formed by sequentially connecting a head end unit 1, a plurality of repetitive units 2, and a tail end unit 3. The head end unit 1 includes: a top adhesive cartridge 11, where a head end triggering mechanism 12 is disposed in the top adhesive cartridge 11, and the head end triggering mechanism 12 is configured to control adhesive fluid in the top adhesive cartridge 11 to flow out; and a head end assembling member 13, where one end is fixedly connected to a bottom end of the top adhesive cartridge 11, and the other end of the head end assembling member 13 is fixedly connected to the repetitive unit 2. Each repetitive unit 2 includes: a three-dimensional disturbance stress sensor 21; a first assembling member 22, where one end is fixedly connected to the other end of the three-dimensional disturbance stress sensor 21; a first hole packer 23, disposed in the middle of the first assembling member 22 and configured to block the adhesive fluid; a first pushing rod 24, where one end is fixedly connected to the other end of the first assembling member 22; a second assembling member 25, where one end is fixedly connected to the other end of the first pushing rod 24; a first adhesive cartridge 26, where a first triggering mechanism 28 is disposed in the first adhesive cartridge 26, the first triggering mechanism 28 is configured to control adhesive fluid in the first adhesive cartridge 26 to flow out, and a top end of the first adhesive cartridge 26 is fixedly connected to the other end of the second assembling member 25; and a third assembling member 27, where one end is fixedly connected to a bottom end of the first adhesive cartridge 26. One end of a three-dimensional disturbance stress sensor 21 of a first repetitive unit 2 in the plurality of repetitive units 2 is fixedly connected to the other end of the head end assembling member 13, the other end of a third assembling member 27 of the first repetitive unit 2 is fixedly connected to one end of a three-dimensional disturbance stress sensor 21 of a next repetitive unit 2, and the other end of a three-dimensional disturbance stress sensor 21 of a last repetitive unit 2 is fixedly connected to the tail end unit 3. The tail end unit 3 includes: a tail end assembling member 31, where one end is fixedly connected to the other end of the three-dimensional disturbance stress sensor 21 of the last repetitive unit 2; and a tail end pushing rod 32, where one end is detachably connected to the other end of the tail end assembling member 31.

Specifically, the mounting device of the tandem-type rock mass three-dimensional disturbance stress sensor 21 provided in the present invention is formed by sequentially connecting the head end unit 1, the plurality of repetitive units 2, and the tail end unit 3. The head end unit 1 includes the top adhesive cartridge 11 and the head end assembling member 13, and the head end triggering mechanism 12 is disposed in the top adhesive cartridge 11, to control the adhesive fluid in the top adhesive cartridge 11 to flow out. One end of the head end assembling member 13 is fixedly connected to the bottom end of the top adhesive cartridge 11, and the other end thereof is fixedly connected to the repetitive unit 2, to form the top adhesive cartridge 11 and the repetitive unit 2 into a whole. Each repetitive unit 2 includes the three-dimensional disturbance stress sensor 21, the first assembling member 22, and the first hole packer 23. One end of the three-dimensional disturbance stress sensor 21 of the first repetitive unit 2 in the plurality of repetitive units 2 is fixedly connected to the other end of the head end assembling member 13, and the other end thereof is fixedly connected to the first assembling member 22, to fix a measuring direction of the three-dimensional disturbance stress sensor 21. The first hole packer 23 is disposed in the middle of the first assembling member 22, and when the adhesive fluid in the top adhesive cartridge 11 flows out to the vicinity of the three-dimensional disturbance stress sensor 21, the first hole packer 23 not only can seal a borehole, but also can prevent the adhesive fluid from continuing to flow, thereby reducing the use amount of the adhesive fluid and improving a coupling effect between the three-dimensional disturbance stress sensor 21 and a rock mass. Each repetitive unit 2 further includes the first pushing rod 24, the second assembling member 25, the first adhesive cartridge 26, and the third assembling member 27. One end of the first pushing rod 24 is fixedly connected to the first assembling member 22, to facilitate delivering the three-dimensional disturbance stress sensor 21 to a pre-mounting position. One end of the second assembling member 25 is fixedly connected to the other end of the first pushing rod 24, and the other end thereof is fixedly connected to the top end of the first adhesive cartridge 26. One end of the third assembling member 27 of the first repetitive unit 2 is fixedly connected to the bottom end of the first adhesive cartridge 26, the other end thereof is fixedly connected to one end of the three-dimensional disturbance stress sensor 21 in the next repetitive unit 2, and the first triggering mechanism 28 is disposed in the first adhesive cartridge 26, to facilitate performing adhesive injection on the three-dimensional disturbance stress sensor 21 in the next repetitive unit 2 by using the adhesive fluid in the first adhesive cartridge 26. In this way, a plurality of three-dimensional disturbance stress sensors 21 are mounted in one borehole at intervals. The tail end unit 3 includes the tail end assembling member 31 and the tail end pushing rod 32. One end of the tail end assembling member 31 is fixedly connected to the other end of the three-dimensional disturbance stress sensor 21 of the last repetitive unit 2, and the other end thereof is detachably connected to the tail end pushing rod 32, to facilitate delivering the last three-dimensional disturbance stress sensor 21 to the pre-mounting position in the borehole by the tail end pushing rod 32 or to perform recycling. In the present invention, the plurality of three-dimensional disturbance stress sensors 21 can be accurately mounted in one borehole without adopting full-hole grouting bonding, thereby mounting the rock mass three-dimensional disturbance stress sensors 21 in a single-hole multi-point distributive manner. The adhesive fluid in the top adhesive cartridge 11 is triggered through the head end triggering mechanism 12 to bond the three-dimensional disturbance stress sensor 21 in the first repetitive unit 2, and the adhesive fluid in the corresponding first adhesive cartridge 26 is triggered by using the first triggering mechanism 28 to bond the three-dimensional disturbance stress sensor 21 in another repetitive unit 2, to ensure good coupling between the three-dimensional disturbance stress sensor 21 and the rock mass, thereby improving mounting convenience and correctness of the three-dimensional disturbance stress sensor 21, ensuring that rock mass disturbance stress is successfully monitored, and avoiding resulting in failure of a stress monitoring sensor, a large error in results, repeated testing costs, and apparatus loss.

In some possible implementations, the head end triggering mechanism 12 includes: a micro motor 121, where the micro motor 121 is fixed in the top adhesive cartridge 11; a spring 122, where one end of the spring 122 is fixed on the micro motor 121; a vertical rod 123, where a top end of the vertical rod 123 is fixedly connected to the other end of the spring 122; and a blocking member 124, where the blocking member 124 is fixed at a bottom end of the vertical rod 123 and is configured to prevent the adhesive fluid in the top adhesive cartridge 11 from flowing out.

Figure 2:
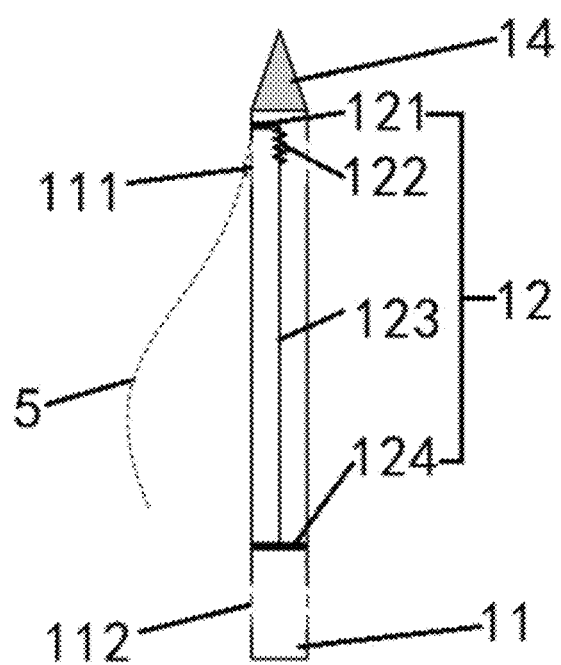
FIG. 2 is a schematic structural diagram of a top adhesive cartridge according to the present invention.

A person skilled in the art may understand that, as shown in FIG. 2, the head end triggering mechanism 12 includes the micro motor 121, the spring 122, the vertical rod 123, and the blocking member 124. The micro motor 121 is fixed in the top adhesive cartridge 11 and may be connected to a triggering power supply 4 outside the hole through a cable 5. One end of the spring 122 is fixed on the micro motor 121, and the other end thereof is fixedly connected to the top end of the vertical rod 123. The blocking member 124 is disposed at the bottom end of the vertical rod 123, to prevent the adhesive fluid in the top adhesive cartridge 11 from flowing out. When the micro motor 121 is powered on, the spring 122 is triggered to deform and eject the vertical rod 123. At the same time, under pushing of the gravity of the adhesive fluid, the blocking member 124 reaches a bottom portion of the top adhesive cartridge 11, and the adhesive fluid flows out of the top adhesive cartridge 11 to the vicinity of the three-dimensional disturbance stress sensor 21, to perform adhesive injection on the three-dimensional disturbance stress sensor 21, thereby bonding the three-dimensional disturbance stress sensor 21 and the rock mass in a one-touch triggering manner to improve a coupling effect. In a specific embodiment, the micro motor 121 is a disposable power supply device, and after the micro motor is powered on and triggering is performed, a circuit of the micro motor 121 is disconnected. In addition, the first triggering mechanism 28 in the repetitive unit 2 has the same structure as the head end triggering mechanism 12 and is connected in series with the head end triggering mechanism 12 through the cable 5.

In some possible implementations, the first hole packer 23 includes: a rubber airbag 231, where the rubber airbag 231 is sleeved on a middle side wall of the first assembling member 22; a first stainless steel cable tie 232, configured to fix one end of the rubber airbag 231 to the first assembling member 22; and a second stainless steel cable tie 233, configured to fix the other end of the rubber airbag 231 to the first assembling member 22.

To prevent the adhesive fluid from flowing to the borehole in all directions, the first hole packer 23 is disposed near a corresponding three-dimensional disturbance stress sensor 21, to block the adhesive fluid and enable the adhesive fluid to flow to the corresponding three-dimensional disturbance stress sensor 21 as much as possible, to implement accurate adhesive injection, thereby reducing the use amount of the adhesive fluid. In a specific embodiment, the first hole packer 23 includes the rubber airbag 231, the first stainless steel cable tie 232, and the second stainless steel cable tie 233. The rubber airbag 231 is sleeved on the middle side wall of the first assembling member 22, one end of the rubber airbag 231 is fixed on the first assembling member 22 through the first stainless steel cable tie 232, and the other end of the rubber airbag 231 is fixed on the first assembling member 22 through the second stainless steel cable tie 233, to seal the rubber airbag 231. An air pipe 7 is disposed on the rubber airbag 231, to pressurize the rubber airbag 231, thereby enabling the rubber airbag to dilate to block the adhesive fluid.

In some possible implementations, the head end unit 1 further includes a stainless steel conical hole cover 14, and the stainless steel conical hole cover 14 is detachably connected to a top end of the top adhesive cartridge 11.

This is because disposing the stainless steel conical hole cover 14 at the top end of the top adhesive cartridge 11 may play a guiding role.

In some possible implementations, the top adhesive cartridge 11 and the first adhesive cartridge 26 are both configured to store the adhesive fluid. An upper portion of the top adhesive cartridge 11 is provided with two head end adhesive inlets 111 in an evenly-spaced manner, and a lower portion of the top adhesive cartridge 11 is provided with four head end adhesive outlets 112 in an evenly-spaced manner. An upper portion of the first adhesive cartridge 26 is provided with two first adhesive inlets in an evenly-spaced manner, and a lower portion of the first adhesive cartridge 26 is provided with four first adhesive outlets in an evenly-spaced manner.

Figure 3:
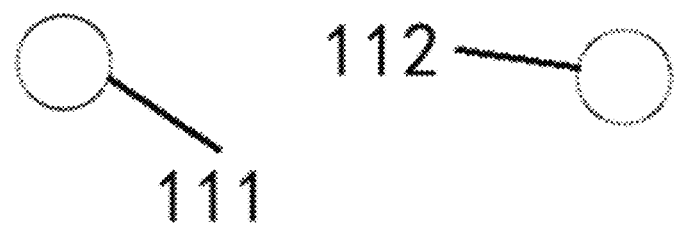
FIG. 3 is a schematic structural diagram of an adhesive inlet and an adhesive outlet in a top adhesive cartridge according to the present invention.

A person skilled in the art may understand that, as shown in FIG. 3, the upper portion of the top adhesive cartridge 11 is provided with the two head end adhesive inlets 111, and the lower portion thereof is provided with the four head end adhesive outlets 112. The head end adhesive inlets 111 are formed between the micro motor 121 and the blocking member 124, and the head end adhesive outlets 112 are formed between the bottom end of the top adhesive cartridge 11 and the blocking member 124. Before construction, the adhesive fluid is filled in the top adhesive cartridge 11 from the head end adhesive inlets 111, and the blocking member 124 may prevent the adhesive fluid from flowing out of the top adhesive cartridge 11. After the micro motor 121 is powered on, the blocking member 124 moves with the vertical rod 123 to a bottom portion of the top adhesive cartridge 11, so that the adhesive fluid flows out from the head end adhesive outlets 112, to perform adhesive injection on the three-dimensional disturbance stress sensor 21. In addition, each first adhesive cartridge 26 has the same structure as the top adhesive cartridge 11, which is conducive to performing accurate adhesive injection on the corresponding three-dimensional disturbance stress sensor 21 by using the adhesive fluid in the first adhesive cartridge 26.

In some possible implementations, the mounting device further includes a triggering power supply 4, and the triggering power supply 4 is sequentially connected to the first triggering mechanism 28 in each repetitive unit 2 and the head end triggering mechanism 12 through the cable 5. The triggering power supply 4 includes an indicator light and a switch. The indicator light is configured to indicate whether each first triggering mechanism 28 and the head end triggering mechanism 12 are successfully triggered, and the switch is configured to control each first triggering mechanism 28 and the head end triggering mechanism 12 to be powered on.

To trigger the adhesive fluid in the top adhesive cartridge 11 and all the first adhesive cartridges 26 to flow out simultaneously in a one-touch manner, the micro motor 121 of the first triggering mechanism 28 in each repetitive unit 2 and the micro motor 121 of the head end triggering mechanism 12 are sequentially connected through the cable 5, and the cable 5 is connected to the triggering power supply 4, to form a series circuit. In addition, the triggering power supply 4 is further provided with the indicator light and the switch. Whether the triggering is successful is indicated through the indicator light, and powering-on is implemented through the switch.

It should be added that a method for judging whether the triggering of the triggering power supply 4 is successful includes the following steps: the indicator light and the switch are disposed on the triggering power supply 4, where the indicator light is configured to indicate whether each first triggering mechanism 28 and the head end triggering mechanism 12 are successfully triggered, and the switch is configured to control each first triggering mechanism 28 and the head end triggering mechanism 12 to be powered on. When the switch is pressed down, the indicator light flashes: if the indicator light flashes once, the switch is pressed down again, and if the indicator light no longer flashes, the triggering is successful; and if the indicator light is off or the indicator light is always on, the triggering fails.

In some possible implementations, the tail end assembling member 31 includes: a connecting member 311, where one end of the connecting member 311 is fixedly connected to the other end of the three-dimensional disturbance stress sensor 21 of the last repetitive unit 2, and the other end of the connecting member 311 is detachably connected to one end of the tail end pushing rod 32; and a tail end hole packer 312, where the tail end hole packer 312 is sleeved on a middle side wall of the connecting member 311, one end of the tail end hole packer 312 is fixedly connected to the connecting member 311 through a first cable tie, and the other end of the tail end hole packer 312 is fixedly connected to the connecting member 311 through a second cable tie.

A person skilled in the art may understand that, the tail end assembling member 31 includes the connecting member 311 and the tail end hole packer 312. One end of the connecting member 311 is fixedly connected to the three-dimensional disturbance stress sensor 21 in the last repetitive unit 2, and the other end thereof is detachably connected to the tail end pushing rod 32, to fix the three-dimensional disturbance stress sensor 21 and deliver the three-dimensional disturbance stress sensor to a specified position in the borehole. The tail end hole packer 312 is preferably the rubber airbag 231 and is fixed on the connecting member 311 through the first cable tie and the second cable tie. The air pipe 7 is led out from the rubber airbag 231 to be connected to an external pressurizer, to control pressure of the rubber airbag 231.

In some possible implementations, the mounting device further includes an external pressurizer 6, and the external pressurizer 6 is sequentially connected to the tail end hole packer 312 and the first hole packer 23 in each repetitive unit 2 through the air pipe 7. The external pressurizer 6 is provided with a pressure gauge, and the pressure gauge is configured to indicate pressure in the tail end hole packer 312 and each first hole packer 23.

This is because disposing the external pressurizer 6 outside the borehole and disposing the pressure gauge on the external pressurizer 6 may adjust and control the pressure in the tail end hole packer 312 and all the first hole packers 23. The tail end hole packer 312 and all the first hole packers 23 are connected in series through the air pipe 7, and the air pipe 7 is connected to the external pressurizer 6, to pressurize the tail end hole packer 312 and all the first hole packers 23 through the external pressurizer 6, to enable the tail end hole packer and all the first hole packers to dilate to block the adhesive fluid, thereby sealing the borehole.

Figure 4:
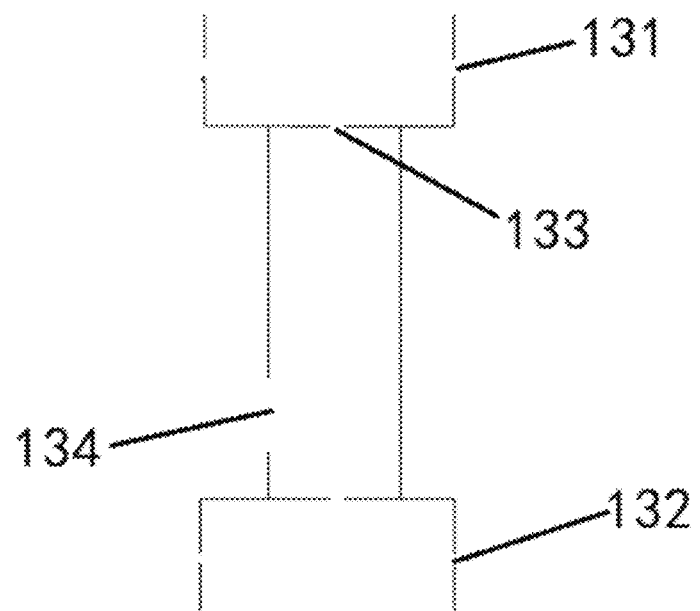
FIG. 4 is a schematic structural diagram of a head end assembling member according to the present invention.

As shown in FIG. 4, two ends of the head end assembling member 13 may be disposed as square cover caps. Four first bolt interfaces 131 are formed around the square cover cap at one end in an evenly-spaced manner, four second bolt interfaces 132 are formed around the square cover cap at the other end in an evenly-spaced manner, and the middle of the square cover cap is provided with a first cable penetrating opening 133. One side of the head end assembling member 13 is provided with a first cable outlet 134, so that the cable 5 led out from the three-dimensional disturbance stress sensor 21 sequentially passes through the first cable penetrating opening 133 and the first cable outlet 134 to be connected to the head end triggering mechanism 12. In addition, one end of the head end assembling member 13 is threadedly connected to the bottom end of the top adhesive cartridge 11 through the first bolt interfaces 131, and the other end of the head end assembling member 13 is fixedly connected to the three-dimensional disturbance stress sensor 21 through the second bolt interfaces 132.

Figure 5:
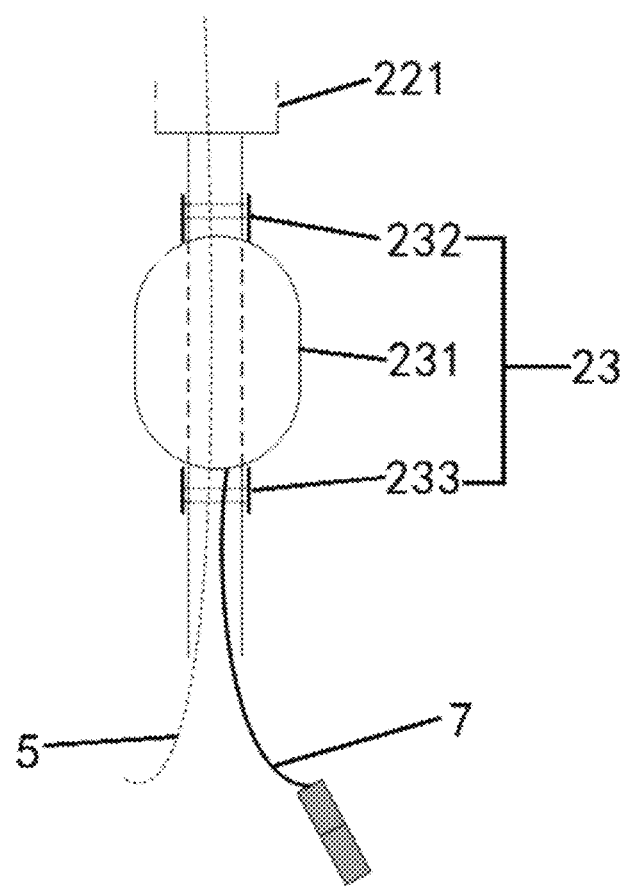
FIG. 5 is a schematic structural diagram of a first assembling member according to the present invention.

As shown in FIG. 5, one end of the first assembling member 22 is disposed as a square cover cap, and four third threaded interfaces 221 are formed around the square cover cap in an evenly-spaced manner. One end of the first assembling member 22 is fixedly connected to the three-dimensional disturbance stress sensor 21 through the third threaded interfaces 221, to be combined with the head end assembling member 13 to fix a measuring direction of the three-dimensional disturbance stress sensor 21, the middle of the first assembling member 22 is provided with the first hole packer 23, and the other end of the first assembling member 22 is fixedly connected to the first pushing rod 24. In addition, the tail end assembling member 31 has a similar structure to the first assembling member 22.

Figure 6:
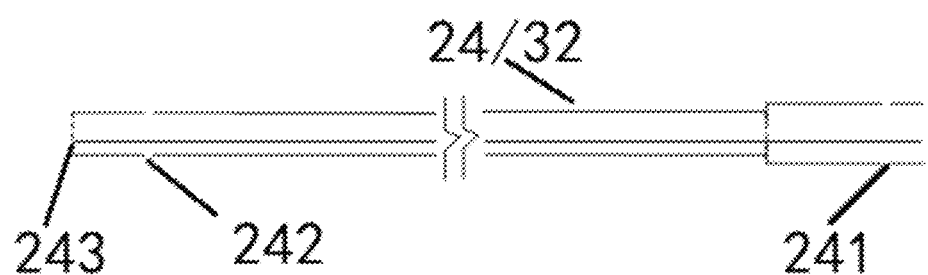
FIG. 6 is a schematic structural diagram of a first pushing rod/a tail end pushing rod according to the present invention.
Figure 7:
FIG. 7 is a schematic structural diagram of a square interface and a latch opening in a first pushing rod according to the present invention.

As shown in FIG. 6 and FIG. 7, the first pushing rod 24 has the same structure as the tail end pushing rod 32. The first pushing rod 24 is a square rod, one end of the first pushing rod 24 is provided with a square interface 241, and the other end thereof is provided with a latch opening 242. One end of the first pushing rod 24 is fixedly connected to the first assembling member 22 through the square interface 241, and the other end thereof is fixedly connected to the second assembling member 25 through the latch opening 242. One side of the first pushing rod 24 is provided with an opening slot 243, which is used for the cable 5. The air pipe 7 passes through the first pushing rod 24.

Figure 8:
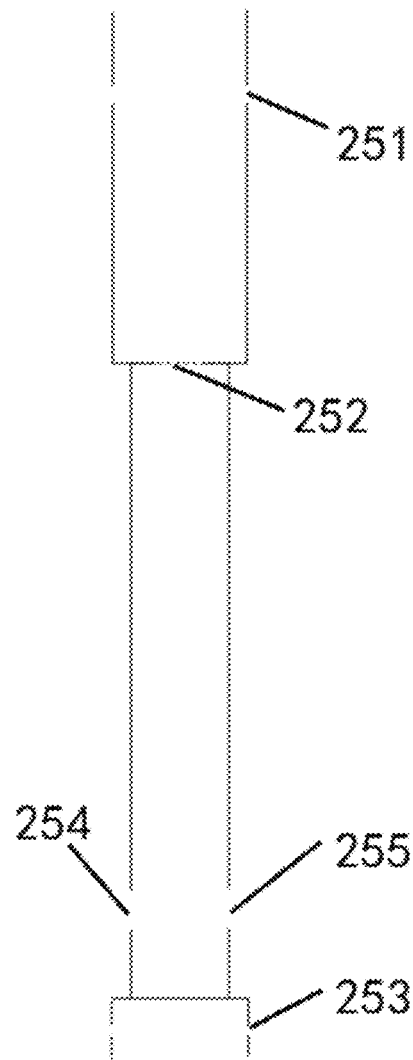
FIG. 8 is a schematic structural diagram of a second assembling member according to the present invention.

As shown in FIG. 8, two ends of the second assembling member 25 may be disposed as square cover caps. Four fourth bolt interfaces 251 are formed around the square cover cap at one end in an evenly-spaced manner, the middle of the square cover cap is provided with a second cable penetrating opening 252, and four fifth bolt interfaces 253 are formed around the square cover cap at the other end in an evenly-spaced manner. One side of the second assembling member 25 is provided with a second cable outlet 254, and the other side thereof is provided with a third cable outlet 255. One end of the second assembling member 25 is threadedly connected to the first pushing rod 24 through the fourth bolt interfaces 251, and the other end thereof is fixedly connected to the top end of the first adhesive cartridge 26 through the fifth bolt interfaces 253. The cable 5 led out from the first pushing rod 24 sequentially passes through the second cable penetrating opening 252 and the second cable outlet 254 to be electrically connected to the first triggering mechanism 28 in the first adhesive cartridge 26, to form a series circuit. The air pipe 7 led out from the first pushing rod 24 sequentially passes through the second cable penetrating opening 252 and the third cable outlet 255 and bypasses the first adhesive cartridge 26 to be connected to the air pipe 7 on the first hole packer 23 in the next repetitive unit 2 or to be connected to the air pipe 7 on the tail end hole packer 312, to form an air pressure path.

Embodiment 2

The present invention provides a mounting method of a tandem-type rock mass three-dimensional disturbance stress sensor 21, where disturbance stress of a rock mass is monitored through the mounting device of a tandem-type rock mass three-dimensional disturbance stress sensor 21 according to the first aspect, and the method includes:
  providing a borehole that is at a preset dip angle in a tunnel or a lane, detecting the borehole by using a borehole camera, and recording detected data of the borehole;
  determining a quantity and mounting positions of three-dimensional disturbance stress sensors 21 according to the detected data, calculating a distance between three-dimensional disturbance stress sensors 21 in two adjacent repetitive units 2, and determining a quantity of first pushing rods as N−1;
  filling adhesive fluid in a top adhesive cartridge 11, and disposing a head end triggering mechanism 12 in the top adhesive cartridge 11, to control the adhesive fluid in the top adhesive cartridge 11 to flow out;
  connecting the top adhesive cartridge 11 to a three-dimensional disturbance stress sensor 21 of a first repetitive unit 2 through a head end assembling member 13, connecting the three-dimensional disturbance stress sensor 21 of the first repetitive unit 2 to a first first pushing rod through a first assembling member 22, and disposing a first hole packer 23 in the middle of the first assembling member 22, to block the adhesive fluid flowing out of the top adhesive cartridge 11;
  delivering the three-dimensional disturbance stress sensor 21 of the first repetitive unit 2 to a preset mounting position in the borehole through the first first pushing rod;
  filling adhesive fluid in a first adhesive cartridge 26, and disposing a first triggering mechanism 28 in the first adhesive cartridge 26, to control the adhesive fluid in the first adhesive cartridge 26 to flow out;
  connecting the first adhesive cartridge 26 to the first first pushing rod through a second assembling member, and fixedly connecting one end of a third assembling member 27 to a bottom end of the first adhesive cartridge 26;
  fixedly connecting the other end of the third assembling member 27 of the first repetitive unit 2 to one end of a three-dimensional disturbance stress sensor 21 of a second repetitive unit 2, fixedly connecting the other end of the three-dimensional disturbance stress sensor 21 of the second repetitive unit 2 to a second first pushing rod through a first assembling member 22 of the second repetitive unit 2, and disposing a first hole packer 23 in the middle of the first assembling member 22 of the second repetitive unit 2, to block the adhesive fluid flowing out of the first adhesive cartridge 26 in the first repetitive unit 2;
  delivering the three-dimensional disturbance stress sensor 21 of the second repetitive unit 2 to a preset mounting position in the borehole through the second first pushing rod;
  by analogy,
  fixedly connecting the other end of a third assembling member 27 of a $(N-2)^{th}$ repetitive unit 2 to one end of a three-dimensional disturbance stress sensor 21 of a $(N-1)^{th}$ repetitive unit 2, fixedly connecting the other end of the three-dimensional disturbance stress sensor 21 of the $(N-1)^{th}$ repetitive unit 2 to a $(N-1)^{th}$ first pushing rod through a first assembling member 22 of the $(N-1)^{th}$ repetitive unit 2, and blocking adhesive fluid flowing out of a first adhesive cartridge 26 in the $(N-2)^{th}$ repetitive unit 2 through a first hole packer 23 of the $(N-1)^{th}$ repetitive unit 2;
  delivering the three-dimensional disturbance stress sensor 21 of the $(N-1)^{th}$ repetitive unit 2 to a preset mounting position in the borehole through the $(N-1)^{th}$ first pushing rod;
  fixedly connecting the other end of a third assembling member 27 of the $(N-1)^{th}$ repetitive unit 2 to one end of a three-dimensional disturbance stress sensor 21 of an $N^{th}$ repetitive unit 2, fixedly connecting the other end of the three-dimensional disturbance stress sensor 21 of the $N^{th}$ repetitive unit 2 to one end of a tail end assembling member 31, and detachably connecting the other end of the tail end assembling member 31 to a tail end pushing rod 32; and
  delivering the three-dimensional disturbance stress sensor 21 of the $N^{th}$ repetitive unit 2 to a preset mounting position in the borehole through the tail end pushing rod 32, to mount the tandem-type rock mass three-dimensional disturbance stress sensor 21, where
  N−1 is an integer greater than 1.

In some possible implementations, the method further includes: disposing a triggering power supply 4 and an external pressurizer 6 on an external portion of the borehole, where the triggering power supply 4 is sequentially connected to the first triggering mechanism 28 in each repetitive unit 2 and the head end triggering mechanism 12 through a cable 5 and is configured to trigger the adhesive fluid in the top adhesive cartridge 11 and each first adhesive cartridge 26 to flow out; and the external pressurizer 6 is sequentially connected to the first hole packer 23 in each repetitive unit 2 through an air pipe 7 and is configured to adjust pressure in each first hole packer 23, to seal the borehole.

Specifically, the borehole is provided in a surrounding rock in the lane or the tunnel according to the preset dip angle, and the borehole is explored by using the borehole camera, to check and observe whether there is hole collapse in the hole and whether a rock wall in the hole is smooth. Positions of rock mass fracture and fracture development in the hole are recorded, to avoid mounting the sensor at the positions, thereby determining the quantity and the mounting positions of the three-dimensional disturbance stress sensors 21. The distance between the three-dimensional disturbance stress sensors 21 in the two adjacent repetitive units 2 is calculated, to determine the quantity of the first pushing rods as N−1. The adhesive fluid is filled in the top adhesive cartridge 11, and the head end triggering mechanism 12 is disposed in the top adhesive cartridge 11, to control the adhesive fluid in the top adhesive cartridge 11 to flow out. One end of the head end assembling member 13 is fixedly connected to the top adhesive cartridge 11, and the other end thereof is fixedly connected to one end of the three-dimensional disturbance stress sensor 21 of the first repetitive unit 2, to fix the top portion. Then a plurality of repetitive units 2 are mounted. The other end of the three-dimensional disturbance stress sensor 21 of the first repetitive unit 2 is fixedly connected to the first assembling member 22 of the first repetitive unit 2, and the first hole packer 23 is disposed in the middle of the first assembling member 22, to block the adhesive fluid flowing out of the top adhesive cartridge 11. One end of the first first pushing rod is fixedly connected to the three-dimensional disturbance stress sensor 21 of the first repetitive unit 2 through the first assembling member 22 of the first repetitive unit 2, to slowly deliver the three-dimensional disturbance stress sensor 21 of the first repetitive unit 2 to the preset mounting position in the borehole through the first first pushing rod, thereby mounting and fixing the three-dimensional disturbance stress sensor 21 of the first repetitive unit 2.

The adhesive fluid is filled in the first adhesive cartridge 26 of the first repetitive unit 2, and the first triggering mechanism 28 is disposed in the first adhesive cartridge 26, to control the adhesive fluid in the first adhesive cartridge 26 to flow out. The first adhesive cartridge 26 is fixedly connected to the other end of the first first pushing rod through the second assembling member, one end of the third assembling member 27 of the first repetitive unit 2 is fixedly connected to the first adhesive cartridge 26, the other end of the third assembling member 27 of the first repetitive unit 2 is fixedly connected to one end of the three-dimensional disturbance stress sensor 21 of the second repetitive unit 2, the other end of the three-dimensional disturbance stress sensor 21 of the second repetitive unit 2 is fixedly connected to the second first pushing rod through the first assembling member 22 of the second repetitive unit 2, and the first hole packer 23 is disposed in the middle of the first assembling member 22 of the second repetitive unit 2, to block the adhesive fluid flowing out of the first adhesive cartridge 26 in the first repetitive unit 2. The three-dimensional disturbance stress sensor 21 of the second repetitive unit 2 is delivered to the preset mounting position in the borehole through the second first pushing rod, to mount the three-dimensional disturbance stress sensor 21 of the second repetitive unit 2.

Adhesive fluid is filled in a first adhesive cartridge 26 of the second repetitive unit 2, and a first triggering mechanism 28 is disposed in the first adhesive cartridge 26, to control the adhesive fluid in the first adhesive cartridge 26 to flow out. The first adhesive cartridge 26 is fixedly connected to the other end of the second first pushing rod through a second assembling member, one end of a third assembling member 27 of the second repetitive unit 2 is fixedly connected to the first adhesive cartridge 26, the other end of the third assembling member 27 of the second repetitive unit 2 is fixedly connected to one end of a three-dimensional disturbance stress sensor 21 of a third repetitive unit 2, the other end of the three-dimensional disturbance stress sensor 21 of the third repetitive unit 2 is fixedly connected to a third first pushing rod through a first assembling member 22 of the third repetitive unit 2, and a first hole packer 23 is disposed in the middle of the first assembling member 22 of the third repetitive unit 2, to block the adhesive fluid flowing out of the first adhesive cartridge 26 in the second repetitive unit 2. The three-dimensional disturbance stress sensor 21 of the third repetitive unit 2 is delivered to a preset mounting position in the borehole through the third first pushing rod, to mount the three-dimensional disturbance stress sensor 21 of the third repetitive unit 2.

The above steps are repeated, to mount the three-dimensional disturbance stress sensor 21 of the $(N-1)^{th}$ repetitive unit 2: adhesive fluid is filled in a first adhesive cartridge 26 of the $(N-2)^{th}$ repetitive unit 2, and a first triggering mechanism 28 is disposed in the first adhesive cartridge 26, to control the adhesive fluid in the first adhesive cartridge 26 to flow out. The first adhesive cartridge 26 is fixedly connected to the other end of a $(N-2)^{th}$ first pushing rod through a second assembling member, one end of a third assembling member 27 of the $(N-2)^{th}$ repetitive unit 2 is fixedly connected to the first adhesive cartridge 26, the other end of the third assembling member 27 of the $(N-2)^{th}$ repetitive unit 2 is fixedly connected to one end of the three-dimensional disturbance stress sensor 21 of the $(N-1)^{th}$ repetitive unit 2, the other end of the three-dimensional disturbance stress sensor 21 of the $(N-1)^{th}$ repetitive unit 2 is fixedly connected to the $(N-1)^{th}$ first pushing rod through the first assembling member 22 of the $(N-1)^{th}$ repetitive unit 2, and the first hole packer 23 is disposed in the middle of the first assembling member 22 of the $(N-1)^{th}$ repetitive unit 2, to block the adhesive fluid flowing out of the first adhesive cartridge 26 in the $(N-2)^{th}$ repetitive unit 2. The three-dimensional disturbance stress sensor 21 of the $(N-1)^{th}$ repetitive unit 2 is delivered to the preset mounting position in the borehole through the $(N-1)^{th}$ first pushing rod, to mount the three-dimensional disturbance stress sensor 21 of the $(N-1)^{th}$ repetitive unit 2.

The other end of the third assembling member 27 of the $(N-1)^{th}$ repetitive unit 2 is fixedly connected to one end of the three-dimensional disturbance stress sensor 21 of the $N^{th}$ repetitive unit 2, the other end of the three-dimensional disturbance stress sensor 21 of the $N^{th}$ repetitive unit 2 is fixedly connected to one end of the tail end assembling member 31, and the other end of the tail end assembling member 31 is detachably connected to the tail end pushing rod 32. The three-dimensional disturbance stress sensor 21 of the $N^{th}$ repetitive unit 2 is delivered to the preset mounting position in the borehole through the tail end pushing rod 32, to mount three-dimensional disturbance stress sensor 21 of the $N^{th}$ repetitive unit 2, thereby mounting the tandem-type rock mass three-dimensional disturbance stress sensor 21.

Further, the triggering power supply 4 and the external pressurizer 6 are disposed on the external portion of the borehole, where the triggering power supply 4 is sequentially connected to the first triggering mechanism 28 in each repetitive unit 2 and the head end triggering mechanism 12 through the cable 5 and is configured to trigger the adhesive fluid in the top adhesive cartridge 11 and each first adhesive cartridge 26 to flow out, to perform adhesive injection on the corresponding three-dimensional disturbance stress sensor 21 in a one-touch triggering manner; and the external pressurizer 6 is sequentially connected to the first hole packer 23 in each repetitive unit 2 through the air pipe 7 and is configured to adjust the pressure in each first hole packer 23, so that the adhesive fluid that flows out is concentrated in the corresponding three-dimensional disturbance stress sensor 21 and the borehole is sealed, to improve a coupling effect between three-dimensional disturbance stress sensor 21 and the rock mass in the tunnel (lane), thereby improving monitoring correctness of three-dimensional disturbance stress sensor 21.

Since Embodiment 2 and Embodiment 1 are embodiments under the same inventive concept, and a part of the structures in the embodiments are exactly the same, the structures in Embodiment 2 that are substantially the same as those in Embodiment 1 are not described in detail. For the parts not described in detail, referring to Embodiment 1.

Finally, it should be noted that the above embodiments are only specific implementations of the present invention and are used to illustrate the technical solutions of the present invention rather than limiting thereto. The protection scope of the present invention is not limited thereto. Although the present invention has been described in detail with reference to the above embodiments, those of ordinary skill in the art should understand that any person familiar with the technical field can still modify or easily think of changes to the technical solutions recorded in the foregoing embodiments or make equivalent replacements for some of the technical features within the technical scope disclosed by the present invention. These modifications, changes or replacements do not cause the essence of the corresponding technical solutions to deviate from the scope of the technical solutions of the embodiments of the present invention and should all fall within the protection scope of the present invention. Therefore, the scope of protection of the present invention shall be subject to the scope of protection of the appended claims. Although the embodiments of the present invention are disclosed above, the embodiments are not limited to the applications listed in the specification and the implementations but totally can be applied to various fields to which the present invention is applicable. For a person skilled in the art, other modifications can be easily made. Therefore, without departing from the general concepts defined in the claims and equivalent ranges, the present invention is not limited to particular details and drawings shown and described herein.

What is claimed is:

1. A mounting device of a tandem-type rock mass three-dimensional disturbance stress sensor, wherein the mounting device is formed by sequentially connecting a head end unit, a plurality of repetitive units, and a tail end unit:
   the head end unit comprises:
   a top adhesive cartridge, wherein a head end triggering mechanism is disposed in the top adhesive cartridge, and the head end triggering mechanism is configured to control adhesive fluid in the top adhesive cartridge to flow out; and
   a head end assembling member, wherein a first end of the head end assembling member is fixedly connected to a bottom end of the top adhesive cartridge, and a second end of the head end assembling member is fixedly connected to the repetitive unit;
   each repetitive unit comprises:
   a three-dimensional disturbance stress sensor;
   a first assembling member, wherein a first end of the first assembling member is fixedly connected to a second end of the three-dimensional disturbance stress sensor;
   a first hole packer, disposed in a middle of the first assembling member and configured to block the adhesive fluid;
   a first pushing rod, wherein a first end of the first pushing rod is fixedly connected to a second end of the first assembling member;
   a second assembling member, wherein a first end of the second assembling member is fixedly connected to a second end of the first pushing rod;
   a first adhesive cartridge, wherein a first triggering mechanism is disposed in the first adhesive cartridge, the first triggering mechanism is configured to control adhesive fluid in the first adhesive cartridge to flow out, and a top end of the first adhesive cartridge is fixedly connected to a second end of the second assembling member; and
   a third assembling member, wherein a first end of the third assembling member is fixedly connected to a bottom end of the first adhesive cartridge;
   a first end of a three-dimensional disturbance stress sensor of a first repetitive unit in the plurality of repetitive units is fixedly connected to the second end of the head end assembling member, a second end of a third assembling member of the first repetitive unit is fixedly connected to a first end of a three-dimensional disturbance stress sensor of a next repetitive unit, and a second end of a last three-dimensional disturbance stress sensor is fixedly connected to the tail end unit; and
   the tail end unit comprises:
   a tail end assembling member, wherein a first end of the tail end assembling member is fixedly connected to the second end of the last three-dimensional disturbance stress sensor; and
   a tail end pushing rod, wherein a first end of the tail end pushing rod is detachably connected to a second end of the tail end assembling member.

2. The mounting device of a tandem-type rock mass three-dimensional disturbance stress sensor according to claim 1, wherein the head end triggering mechanism comprises:
   a micro motor, wherein the micro motor is fixed in the top adhesive cartridge;
   a spring, wherein a first end of the spring is fixed on the micro motor;
   a vertical rod, wherein a top end of the vertical rod is fixedly connected to a second end of the spring; and
   a blocking member, wherein the blocking member is fixed at a bottom end of the vertical rod and is configured to prevent the adhesive fluid in the top adhesive cartridge from flowing out.

3. The mounting device of a tandem-type rock mass three-dimensional disturbance stress sensor according to claim 1, wherein the first hole packer comprises:
   a rubber airbag, wherein the rubber airbag is sleeved on a middle side wall of the first assembling member;
   a first stainless steel cable tie, configured to fix a first end of the rubber airbag to the first assembling member; and
   a second stainless steel cable tie, configured to fix a second end of the rubber airbag to the first assembling member.

4. The mounting device of a tandem-type rock mass three-dimensional disturbance stress sensor according to claim 1, wherein the head end unit further comprises a stainless steel conical hole cover, and the stainless steel conical hole cover is detachably connected to a top end of the top adhesive cartridge.

5. The mounting device of a tandem-type rock mass three-dimensional disturbance stress sensor according to claim 1, wherein the top adhesive cartridge and the first adhesive cartridge are both configured to store the adhesive fluid;
- an upper portion of the top adhesive cartridge is provided with two head end adhesive inlets in an evenly-spaced manner, and a lower portion of the top adhesive cartridge is provided with four head end adhesive outlets in an evenly-spaced manner; and
- an upper portion of the first adhesive cartridge is provided with two first adhesive inlets in an evenly-spaced manner, and a lower portion of the first adhesive cartridge is provided with four first adhesive outlets in an evenly-spaced manner.

6. The mounting device of a tandem-type rock mass three-dimensional disturbance stress sensor according to claim 1, wherein the mounting device further comprises a triggering power supply, and the triggering power supply is sequentially connected to the first triggering mechanism in each repetitive unit and the head end triggering mechanism through a cable; and
- the triggering power supply comprises an indicator light and a switch, where the indicator light is configured to indicate whether each first triggering mechanism and the head end triggering mechanism are successfully triggered, and the switch is configured to control each first triggering mechanism and the head end triggering mechanism to be powered on.

7. The mounting device of a tandem-type rock mass three-dimensional disturbance stress sensor according to claim 1, wherein the tail end assembling member comprises:
- a connecting member, wherein a first end of the connecting member is fixedly connected to the second end of the last three-dimensional disturbance stress sensor, and a second end of the connecting member is detachably connected to the first end of the tail end pushing rod; and
- a tail end hole packer, wherein the tail end hole packer is sleeved on a middle side wall of the connecting member, a first end of the tail end hole packer is fixedly connected to the connecting member through a first cable tie, and a second end of the tail end hole packer is fixedly connected to the connecting member through a second cable tie.

8. The mounting device of a tandem-type rock mass three-dimensional disturbance stress sensor according to claim 7, wherein the mounting device further comprises an external pressurizer, and the external pressurizer is sequentially connected to the tail end hole packer and the first hole packer in each repetitive unit through an air pipe; and
- the external pressurizer is provided with a pressure gauge, and the pressure gauge is configured to indicate pressure in the tail end hole packer and each first hole packer.

9. A mounting method of a tandem-type rock mass three-dimensional disturbance stress sensor, wherein disturbance stress of the rock mass is monitored through the mounting device of a tandem-type rock mass three-dimensional disturbance stress sensor according to claim 1, and the method comprises:
- providing a borehole that is at a preset dip angle in a tunnel or a lane, detecting the borehole by using a borehole camera, and recording detected data of the borehole;
- determining a quantity and mounting positions of three-dimensional disturbance stress sensors according to the detected data, calculating a distance between three-dimensional disturbance stress sensors in two adjacent repetitive units, and determining a quantity of first pushing rods as N−1;
- filling adhesive fluid in a top adhesive cartridge, and disposing a head end triggering mechanism in the top adhesive cartridge, to control the adhesive fluid in the top adhesive cartridge to flow out;
- connecting the top adhesive cartridge to a three-dimensional disturbance stress sensor of a first repetitive unit through a head end assembling member, connecting the three-dimensional disturbance stress sensor of the first repetitive unit to a first first pushing rod through a first assembling member, and disposing a first hole packer in a middle of the first assembling member, to block the adhesive fluid flowing out of the top adhesive cartridge;
- delivering the three-dimensional disturbance stress sensor of the first repetitive unit to a preset mounting position in the borehole through the first first pushing rod;
- filling adhesive fluid in a first adhesive cartridge, and disposing a first triggering mechanism in the first adhesive cartridge, to control the adhesive fluid in the first adhesive cartridge to flow out;
- connecting the first adhesive cartridge to the first first pushing rod through a second assembling member, and fixedly connecting a first end of a third assembling member to a bottom end of the first adhesive cartridge;
- fixedly connecting a second end of the third assembling member of the first repetitive unit to a first end of a three-dimensional disturbance stress sensor of a second repetitive unit, fixedly connecting a second end of the three-dimensional disturbance stress sensor of the second repetitive unit to a second first pushing rod through a first assembling member of the second repetitive unit, and disposing a first hole packer in a middle of the first assembling member of the second repetitive unit, to block the adhesive fluid flowing out of the first adhesive cartridge in the first repetitive unit;
- delivering the three-dimensional disturbance stress sensor of the second repetitive unit to a preset mounting position in the borehole through the second first pushing rod;
- by analogy,
- fixedly connecting a second end of a third assembling member of a $(N-2)^{th}$ repetitive unit to a first end of a three-dimensional disturbance stress sensor of a $(N-1)^{th}$ repetitive unit, fixedly connecting a second end of the three-dimensional disturbance stress sensor of the $(N-1)^{th}$ repetitive unit to a $(N-1)^{th}$ first pushing rod through a first assembling member of the $(N-1)^{th}$ repetitive unit, and blocking adhesive fluid flowing out of a first adhesive cartridge in the $(N-2)^{th}$ repetitive unit through a first hole packer of the $(N-1)^{th}$ repetitive unit;
- delivering the three-dimensional disturbance stress sensor of the $(N-1)^{th}$ repetitive unit to a preset mounting position in the borehole through the $(N-1)^{th}$ first pushing rod;
- fixedly connecting a second end of a third assembling member of the $(N-1)^{th}$ repetitive unit to a first end of an $N^{th}$ three-dimensional disturbance stress sensor, fixedly connecting a second end of the $N^{th}$ three-dimensional disturbance stress sensor to a first end of a tail end assembling member, and detachably connecting a second end of the tail end assembling member to a tail end pushing rod; and
- delivering the $N^{th}$ three-dimensional disturbance stress sensor to a preset mounting position in the borehole through the tail end pushing rod, to mount the tandem-type rock mass three-dimensional disturbance stress sensor, wherein N−1 is an integer greater than 1.

10. The mounting method of a tandem-type rock mass three-dimensional disturbance stress sensor according to claim 9, wherein the method further comprises: disposing a triggering power supply and an external pressurizer on an external portion of the borehole, wherein the triggering power supply is sequentially connected to the first triggering mechanism in each repetitive unit and the head end triggering mechanism through a cable and is configured to trigger the adhesive fluid in the top adhesive cartridge and each first adhesive cartridge to flow out; and the external pressurizer is sequentially connected to the first hole packer in each repetitive unit through an air pipe and is configured to adjust pressure in each first hole packer, to seal the borehole.

\* \* \* \* \*